(12) United States Patent
Singh et al.

(10) Patent No.: US 10,947,925 B2
(45) Date of Patent: Mar. 16, 2021

(54) METHODS FOR REDUCING OIL STICKING ON SURFACES OF INTERNAL COMBUSTION ENGINES

(71) Applicant: Caterpillar Inc., Deerfield, IL (US)

(72) Inventors: Jaswinder Singh, Dunlap, IL (US); Michael Bardell, Peoria, IL (US); Patrick J. Seiler, Peoria, IL (US); Paul S. Wang, Peoria, IL (US); David Ginter, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/446,137

(22) Filed: Jun. 19, 2019

(65) Prior Publication Data

US 2020/0400094 A1 Dec. 24, 2020

(51) Int. Cl.
*F02F 1/40* (2006.01)
*F02F 1/20* (2006.01)

(52) U.S. Cl.
CPC .................. *F02F 1/40* (2013.01); *F02F 1/20* (2013.01); *C03C 2217/76* (2013.01)

(58) Field of Classification Search
CPC ............ F02F 1/40; F02F 1/20; C03C 2217/76
See application file for complete search history.

(56) References Cited

U.S. PATENT DOCUMENTS

| | | | |
|---|---|---|---|
| 2,553,742 A | 5/1951 | Bloch | |
| 5,074,256 A * | 12/1991 | Saito | F01L 3/22 123/41.77 |
| 6,857,417 B2 | 2/2005 | Niwa | |
| 7,562,652 B2 | 7/2009 | Hommes et al. | |
| 7,866,295 B2 | 1/2011 | Shi et al. | |
| 2009/0191397 A1* | 7/2009 | Thottupurathu | B01D 67/0088 428/304.4 |
| 2010/0024898 A1 | 2/2010 | Bansal et al. | |
| 2012/0312189 A1* | 12/2012 | Bessho | C09D 5/1662 106/2 |
| 2017/0131136 A1* | 5/2017 | Nugent | G01G 21/28 |

FOREIGN PATENT DOCUMENTS

DE 4005047 A1 8/1991

* cited by examiner

*Primary Examiner* — Jacob M Amick
*Assistant Examiner* — Charles Brauch
(74) *Attorney, Agent, or Firm* — Harrity & Harrity LLP (57) ABSTRACT

Components for reducing oil sticking on surfaces of an internal combustion engine are disclosed. The engine may include an engine block with a piston cylinder, a piston moveable in reciprocal motion within the piston cylinder, and a cylinder head mounted on the engine block. The engine block, the cylinder head, and the piston may define a combustion chamber. The engine may include an intake conduit mounted to the cylinder head, an intake valve port defined by the cylinder head, and an intake valve mounted in reciprocally movable fashion to the cylinder head for placing the intake valve port in fluid communication with the combustion chamber. The engine may include a first oleophobic coating provided on portions of the intake valve, and a valve seat insert secured to the cylinder head. The valve seat insert may define an oil passage in fluid communication with the intake valve port.

20 Claims, 7 Drawing Sheets

METHODS FOR REDUCING OIL STICKING ON SURFACES OF INTERNAL COMBUSTION ENGINES

TECHNICAL FIELD

The present disclosure relates generally to fluid injection systems of internal combustion engines and, for example, to methods for reducing oil sticking on surfaces of internal combustion engines.

BACKGROUND

In addition to normal lubrication oil use, lube oil may be introduced in very small quantities into a combustion chamber of an internal combustion engine, such as a natural gas reciprocating engine. Fragmented lube oil droplets distributed inside the combustion chamber may ignite to act as sources of ignition for the air-fuel mixture in the combustion chamber. The lube oil may be provided to the combustion chamber via an intake valve port or runner, or via interconnected passages made in a cylinder head and valve seat inserts of intake valves. In both cases, the lube oil droplets are carried into the combustion chamber by an intake charge going into the combustion chamber. The lube oil droplets come in contact with metal surfaces (e.g., inner walls of intake valve ports or runners, a backside of a valve face, a valve seat insert, and/or the like) and may, over time, leave a varnish type deposit on these surfaces, due to oil oxidation. The varnish type deposit may change flow characteristics of freshly introduced lube oil. For example, the lube oil may take longer to reach the combustion chamber from a point of entry, and may continue to enter into the combustion chamber long after injection has ceased. This may make control of starting and stopping of oil droplet-induced ignition timing difficult.

One attempt to prevent the deposition of oil-soluble matter and solid particles within the interior of a vapor distributing system or intake manifold of an engine is disclosed in U.S. Pat. No. 2,553,742 that issued to Bloch on May 22, 1951 ("the '742 patent"). In particular, the '742 patent discloses an intake manifold suitable to distribute fuel to cylinders of an internal combustion engine, which comprises in combination, metallic distributing members having a lipophobic coating on the interior surfaces thereof which are exposed to the fuel stream passing therethrough. The '742 patent also discloses that most of the materials which are deposited within the intake manifold of internal combustion engines are of an oil-soluble nature. Thus, by the use of a lipophobic coating (i.e., one that repels oil or fatty materials) there is provided a surface to which the oil-soluble materials will not adhere and they will be continuously blown or drawn into an engine to be passed therethrough. The '742 patent discloses that there are various types of coating materials which are lipophobic, or hydrophilic, and which may be used in combination with the intake manifold piping or fuel distributing parts.

While the intake manifold of the '742 patent may include a lipophobic coating on interior surfaces thereof, the '742 patent fails to provide the lipophobic coating on surfaces associated with other pathways to a combustion chamber of internal combustion engine that includes a lube oil distribution system. Thus, the '742 patent fails to disclose prevention of lube oil droplets coming in contact with metal surfaces associated with the combustion chamber (e.g., inner walls of intake valve ports or runners, a backside of a valve face, a valve seat insert, and/or the like) and leaving a varnish type deposit due to oil oxidation. The varnish type deposit may change flow characteristics of freshly introduced lube oil, and may make control of the starting and stopping of the ignition timing difficult.

The methods for reducing oil sticking on surfaces of internal combustion engines of the present disclosure solve one or more of the problems set forth above and/or other problems in the art.

SUMMARY

According to some implementations, an internal combustion engine assembly may include an engine block comprising a piston cylinder, and a piston moveable in reciprocal motion within the piston cylinder. The internal combustion engine assembly may include a cylinder head mounted on the engine block, wherein the engine block, the cylinder head, and the piston may define a combustion chamber. The internal combustion engine assembly may include an intake conduit mounted to the cylinder head, and an intake valve port defined by the cylinder head, wherein the intake valve port may be in fluid communication with the intake conduit and with the combustion chamber. The internal combustion engine assembly may include an intake valve mounted in reciprocally movable fashion to the cylinder head for selectively placing the intake valve port in fluid communication with the combustion chamber, and a first oleophobic coating provided on one or more portions of the intake valve. The internal combustion engine assembly may include a valve seat insert secured to the cylinder head near an outlet end of the intake valve port, wherein the valve seat insert may include a valve seat surface for contacting the intake valve when the intake valve is in a closed position, wherein the valve seat insert may define an oil passage in fluid communication with an oil supply conduit and the intake valve port, and wherein oil may be introduced into the combustion chamber by pumping the oil through the oil passage.

According to some implementations, an intake valve assembly may be provided in an internal combustion engine that includes an engine block with a piston cylinder, a piston moveable in reciprocal motion within the piston cylinder, a cylinder head mounted on the engine block, and an intake conduit mounted to the cylinder head, wherein the engine block, the cylinder head, and the piston may define a combustion chamber. The intake valve assembly may include an intake valve port defined by the cylinder head, wherein the intake valve port may be in fluid communication with the intake conduit and with the combustion chamber. The intake valve assembly may include an intake valve mounted in reciprocally movable fashion to the cylinder head for selectively placing the intake valve port in fluid communication with the combustion chamber, and a first oleophobic coating provided on one or more portions of the intake valve port. The intake valve assembly may include a valve seat insert secured to the cylinder head near an outlet end of the intake valve port, wherein the valve seat insert may include a valve seat surface for contacting the intake valve when the intake valve is in a closed position, wherein the valve seat insert may define an oil passage in fluid communication with an oil supply conduit and the intake valve port, and wherein oil may be introduced into the combustion chamber by pumping the oil through the oil passage.

According to some implementations, a machine may include an engine block for an internal combustion engine. The engine block may include a piston cylinder, a piston moveable in reciprocal motion within the piston cylinder, and a cylinder head mounted on the engine block, wherein the engine block, the cylinder head, and the piston may define a combustion chamber. The machine may include an intake conduit mounted to the cylinder head, and an intake valve port defined by the cylinder head, wherein the intake valve port may be in fluid communication with the intake conduit and with the combustion chamber. The machine may include a first oleophobic coating provided on one or more portions of the intake valve port, and an intake valve mounted in reciprocally movable fashion to the cylinder head for selectively placing the intake valve port in fluid communication with the combustion chamber. The machine may include a second oleophobic coating provided on one or more portions of the intake valve, and a valve seat insert secured to the cylinder head near an outlet end of the intake valve port. The valve seat insert may include a valve seat surface for contacting the intake valve when the intake valve is in a closed position, the valve seat insert may define an oil passage in fluid communication with an oil supply conduit and the intake valve port, and oil may be introduced into the combustion chamber by pumping the oil through the oil passage.

DETAILED DESCRIPTION

This disclosure relates to methods for reducing oil sticking on surfaces of an internal combustion engine. The methods for reducing oil sticking on surfaces of an internal combustion engine have universal applicability to any machine utilizing such an internal combustion engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven and/or controlled by an engine controller.

Figure 1:
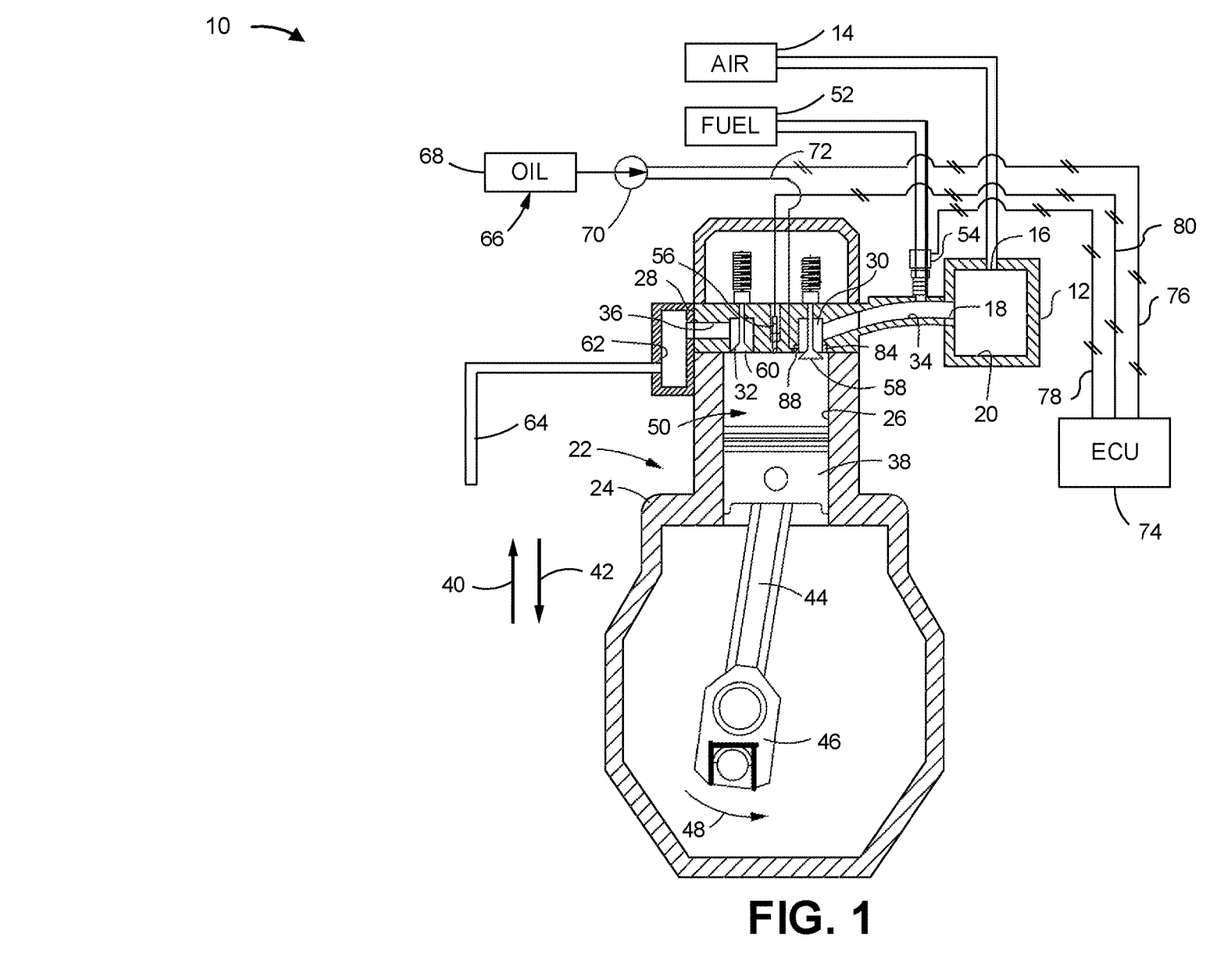
FIG. 1 is a partial cross-sectional, partial schematic view of an example internal combustion engine.

FIG. 1 is a partial cross-sectional, partial schematic view of an example internal combustion engine 10 (e.g., a natural gas reciprocating internal combustion engine, a gasoline internal combustion engine, hereinafter referred to as engine 10). Engine 10 may be provided in a machine, such as one of the machines described above. Engine 10 may include a plenum member 12 and an air source 14. Plenum member 12 may have an inlet opening 16 and an exit opening 18 defined therein. Air source 14 may supply air to inlet opening 16. Air from air source 14 may enter into a plenum chamber 20, defined in plenum member 12, via inlet opening 16.

Engine 10 may include a cylinder assembly 22. Cylinder assembly 22 may include an engine block 24 with one or more piston cylinders 26. A cylinder head 28 may be secured to (e.g., mounted on) engine block 24. Cylinder head 28 may define one or more intake valve ports 30 and one or more exhaust valve ports 32. An intake conduit 34 (e.g., mounted to cylinder head 28) may be in fluid communication with one or more intake valve ports 30, and may place intake valve ports 30 in fluid communication with exit opening 18 of plenum member 12. An exhaust passage 36 may place exhaust valve ports 32 in fluid communication with an exhaust manifold 62.

Engine 10 may include a piston 38 that moves in a reciprocal motion within piston cylinder 26 in general directions of arrows 40 and 42. As piston 38 moves downwardly in the general direction of arrow 42 to a position shown in FIG. 1, a connecting rod 44 causes a crankshaft 46 to rotate in a general direction of arrow 48. Subsequently, as crankshaft 46 continues to rotate in the general direction of arrow 48, crankshaft 46 may cause connecting rod 44 and piston 38 to move in the general direction of arrow 40 and to return piston 38 to an uppermost position (not shown).

Engine block 24, piston 38, piston cylinder 26, and cylinder head 28 may together define a combustion chamber 50 of engine 10. In particular, when piston 38 is moved in the general direction of arrow 40, a volume of combustion chamber 50 is decreased. On the other hand, when piston 38 is moved in the general direction of arrow 42, the volume of combustion chamber 50 is increased as shown in FIG. 1. Combustion chamber 50 may be in fluid communication with one or more intake valve ports 30.

As further shown in FIG. 1, engine 10 may include a gaseous fuel source 52 in fluid communication with intake conduit 34. A gaseous fuel supply valve 54 may control an amount of gaseous fuel, such as natural gas, provided to intake conduit 34. In particular, gaseous fuel supply valve 54 may move between an open position, which causes gaseous fuel to be provided to intake conduit 34, and a closed position, which prevents gaseous fuel from being provided to intake conduit 34. An amount of gaseous fuel provided by gaseous fuel supply valve 54 may control a ratio of air to gaseous fuel (e.g., an air/fuel ratio) provided to combustion chamber 50.

In some implementations, other methods of introducing the gaseous fuel and air mixture to combustion chamber 50 may be used. For example, the gaseous fuel may be mixed with air at any point from air source 14 through intake conduit 34, including upstream of a turbocharger (not shown). Alternatively, the gaseous fuel may be injected directly into combustion chamber 50, and subsequently mixed with the intake of air.

As further shown in FIG. 1, engine 10 may include a spark plug 56 configured to ignite the gaseous fuel and air mixture within combustion chamber 50. Spark plug 56 may enable engine 10 to precisely control ignition of the fuel and air mixture, even during very lean fuel ratios. Ignition of spark plug 56 may permit precise control of combustion in a distributed ignition engine at low equivalence ratios (e.g., ratios less than or equal to 0.5). In some implementations, spark plug 56 may include a J-gap spark plug, a multi-torch spark plug, a pre-chamber spark plug, a laser, and/or the like.

In some implementations, engine 10 may utilize a micro-pilot fuel injector that automatically ignites the fuel in the absence of spark plug 56.

As further shown in FIG. 1, an intake valve 58 may be mounted in a reciprocally movable fashion to cylinder head 28 and may selectively cause plenum chamber 20 to be in fluid communication with combustion chamber 50. Intake valve 58 may be actuated by a camshaft (not shown), a pushrod (not shown), a rocker arm (not shown), any valve actuation system that may be operated hydraulically, electronically, and/or pneumatically; may be driven by rotation of the crankshaft 46; and/or the like. When intake valve 58 is placed in an open position, as shown in FIG. 1, air and gaseous fuel may be provided from intake conduit 34 to combustion chamber 50 via intake valve port 30. When intake valve 58 is placed in a closed position (not shown), gaseous fuel and air may be prevented from being provided from intake conduit 34 to combustion chamber 50 since intake valve 58 blocks fluid flow through intake valve port 30.

As further shown in FIG. 1, an exhaust valve 60 may selectively cause exhaust manifold 62 to be in fluid communication with combustion chamber 50. Exhaust valve 60 may be actuated by a camshaft (not shown), a pushrod (not shown), a rocker arm (not shown), any valve actuation system that may be operated hydraulically, electronically, and/or pneumatically; may be driven by rotation of the crankshaft 46; and/or the like. When exhaust valve 60 is placed in an open position (not shown), exhaust gases may be provided from combustion chamber 50 to exhaust manifold 62 via a fluid path that includes exhaust valve port 32 and exhaust passage 36. The exhaust gases may be provided from exhaust manifold 62 to an exhaust conduit 64. When exhaust valve 60 is placed in the closed position, as shown in FIG. 1, exhaust gases may be prevented from being provided from combustion chamber 50 to exhaust manifold 62 since exhaust valve 60 blocks fluid flow through exhaust valve port 32.

Combustion of the mixture of gaseous fuel and air in combustion chamber 50 may produce numerous exhaust gases, such as oxides of nitrogen (NOx). After the mixture of gaseous fuel and air is combusted in combustion chamber 50, exhaust gases may be provided through exhaust passage 36.

Although only one intake valve 58 and one exhaust valve 60 are shown in FIG. 1, in some implementations, engine 10 may include more than one intake valve 58 and more than one exhaust valve 60 per combustion chamber 50. In some implementations, engine 10 may include more than one intake valve port 30 and more than one exhaust valve port 32 per combustion chamber 50.

As further shown in FIG. 1, engine 10 may include an oil system 66 with an oil sump 68, an oil pump 70, and an oil supply conduit 72. Oil sump 68 may be separate from an oil pan (e.g., coupled with engine block 24), may include or be connected to an oil pan, and/or the like.

As further shown in FIG. 1, engine 10 may include a controller 74, such as, for example, a microprocessor-based engine control unit (ECU). Controller 74 may be used to control the amounts of fuel and oil entering combustion chamber 50. For example, controller 74 may provide a control signal via a first signal line 76 to oil pump 70 to control a timing and a quantity of oil introduced into combustion chamber 50. The control signal may cause oil pump 70 to inject oil through each of one or more oil passages 98 (e.g., as described below in connection with FIG. 3) and into intake valve port 30 when intake valve 58 is open. Alternatively, controller 74 may provide a control signal that causes oil pump 70 to inject oil continuously through each of the one or more oil passages 98 and into the intake valve port 30.

Controller 74 may provide a control signal via a second signal line 78 to gaseous fuel supply valve 54 to control the quantity of fuel introduced into intake conduit 34 and/or combustion chamber 50. For example, if a leaner mixture is to be provided to combustion chamber 50, the control signal may cause gaseous fuel supply valve 54 to provide less gaseous fuel to intake conduit 34. Alternatively, if a richer mixture of air and gaseous fuel is to be provided to combustion chamber 50, the control signal may cause gaseous fuel supply valve 54 to provide more gaseous fuel to intake conduit 34.

In some implementations, controller 74 may control ignition timing for engine 10. For example, controller 74 may provide a control signal via a third signal line 80 to spark plug 56 to precisely control ignition of the fuel and air mixture within combustion chamber 50.

In some implementations, controller 74 may include a processor (e.g., a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component) that is implemented in hardware, firmware, or a combination of hardware and software; a memory that includes a random-access memory (RAM), a read only memory (ROM), and/or another type of dynamic or static storage device (e.g., a flash memory, a magnetic memory, and/or an optical memory) that stores information and/or instructions for use by the processor; and/or the like. Controller 74 may perform one or more processes described herein. Controller 74 may perform these processes based on the processor executing software instructions stored by a non-transitory computer-readable medium, such as the memory. A computer-readable medium is defined herein as a non-transitory memory device. A memory device includes memory space within a single physical storage device or memory space spread across multiple physical storage devices.

Software instructions may be read into the memory from another computer-readable medium or from another device. When executed, software instructions stored in the memory may cause the processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As indicated above, FIG. 1 is provided as an example. Other examples may differ from what is described in connection with FIG. 1. In some implementations, controller 74 may include additional components, fewer components, different components, or differently arranged components than those shown in FIG. 1.

Figure 2:
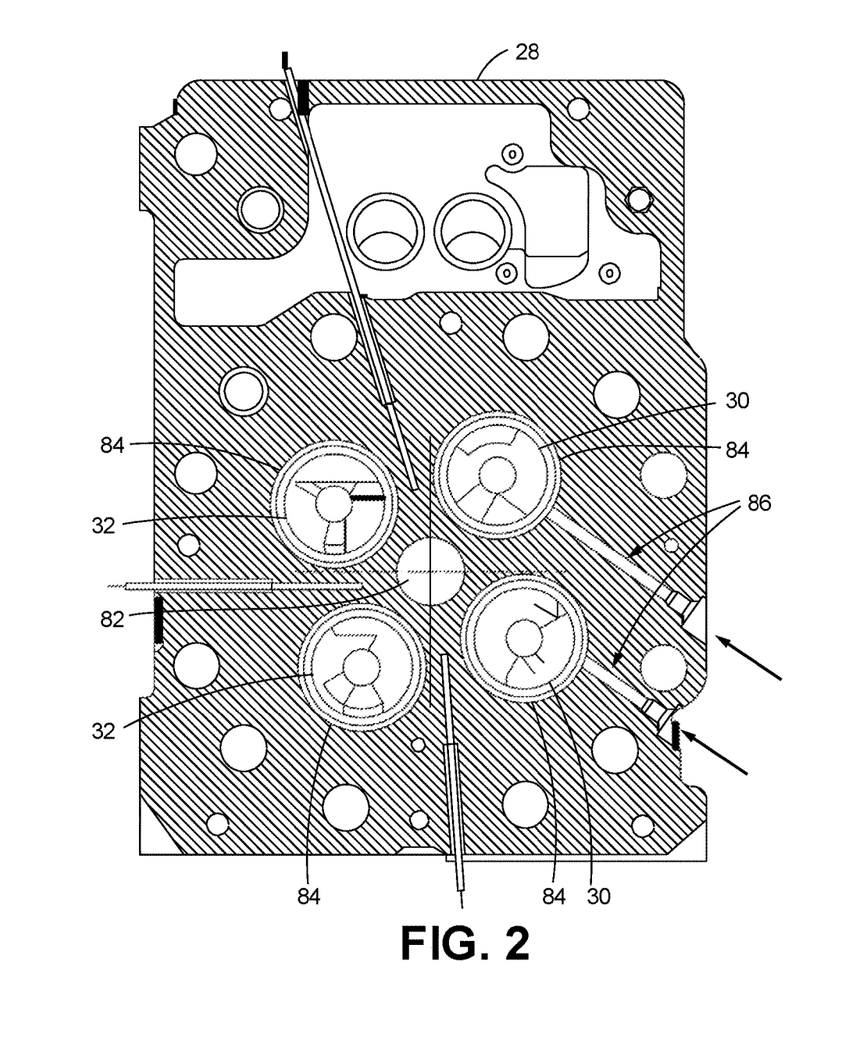
FIG. 2 is a cross-sectional view of a cylinder head of the internal combustion engine shown in FIG. 1.

FIG. 2 is a cross-sectional view of cylinder head 28 of internal combustion engine 10 shown in FIG. 1. The view shown in FIG. 2 may be looking up (e.g., in direction 40 of FIG. 1) from within combustion chamber 50 so that intake valve ports 30 and exhaust valve ports 32 may be clearly seen.

As shown in FIG. 2, cylinder head 28 may define a spark plug opening 82 for accommodating spark plug 56, as shown in FIG. 1. A valve seat insert 84, described in more detail below, may be secured to an outlet end (e.g., an end nearest to combustion chamber 50) of each intake valve port 30. A valve seat insert 84 may also be secured to an inlet end of each exhaust valve port 32.

Cylinder head 28 may include one or more fine (e.g., narrow diameter) oil channels 86, as described below. Each oil channel 86 may extend through cylinder head 28 and may terminate at valve seat insert 84. Each oil channel 86 may be in fluid communication with both oil supply conduit 72 and intake valve port 30.

As indicated above, FIG. 2 is provided as an example. Other examples may differ from what is described in connection with FIG. 2.

Figure 3:
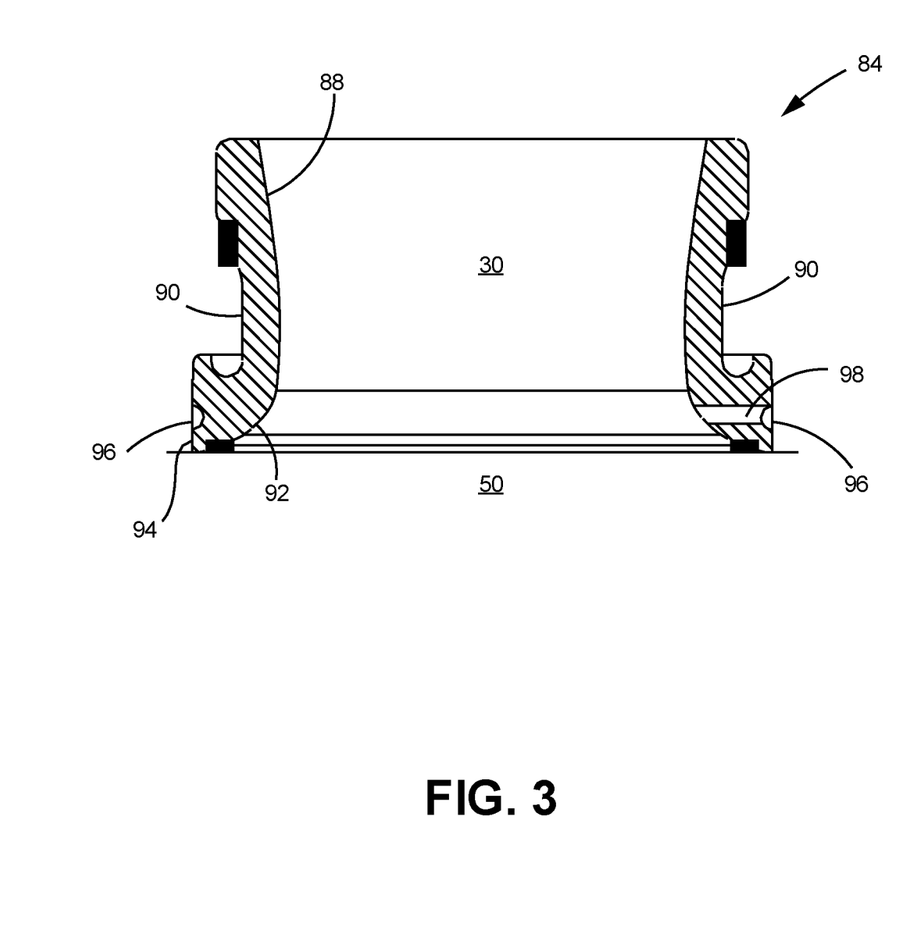
FIG. 3 is a cross-sectional view of a valve seat insert of the cylinder head shown in FIG. 2.

FIG. 3 is a cross-sectional view of valve seat insert 84 of cylinder head 28 shown in FIG. 2. As shown, valve seat insert 84 may be generally shaped like a hollow ring (e.g., provided around and secured to intake valve port 30) and may include an inner wall 88 and an outer wall 90. Inner wall 88 may include a slanted or curved valve seat surface 92 located at a bottom (e.g., outlet) end 94 of valve seat insert 84 (e.g., adjacent to combustion chamber 50). Outer wall 90 of valve seat insert 84 may define an annular groove 96 extending around an exterior periphery of valve seat insert 84. Groove 96, shown in profile, may be machined along a periphery of outer wall 90 near a bottom end 94 of valve seat insert 84. Groove 96 may be semi-circular in cross section and may face outward (e.g., away from a center of intake valve port 30).

As further shown in FIG. 3, valve seat insert 84 may include one or more oil passages 98 that communicate with (e.g., extend between) annular groove 96 and intake valve port 30 for transferring oil or other combustible fluid from groove 96, to intake valve port 30, and ultimately to combustion chamber 50, as described below in connection with FIGS. 6A and 6B. Each oil passage 98 may be drilled through or otherwise formed in valve seat insert 84 with an upstream end communicating with groove 96 and a downstream end communicating with inner wall 88 of valve seat insert 84 (e.g., with intake valve port 30).

As indicated above, FIG. 3 is provided as an example. Other examples may differ from what was described in connection with FIG. 3.

Figure 4:
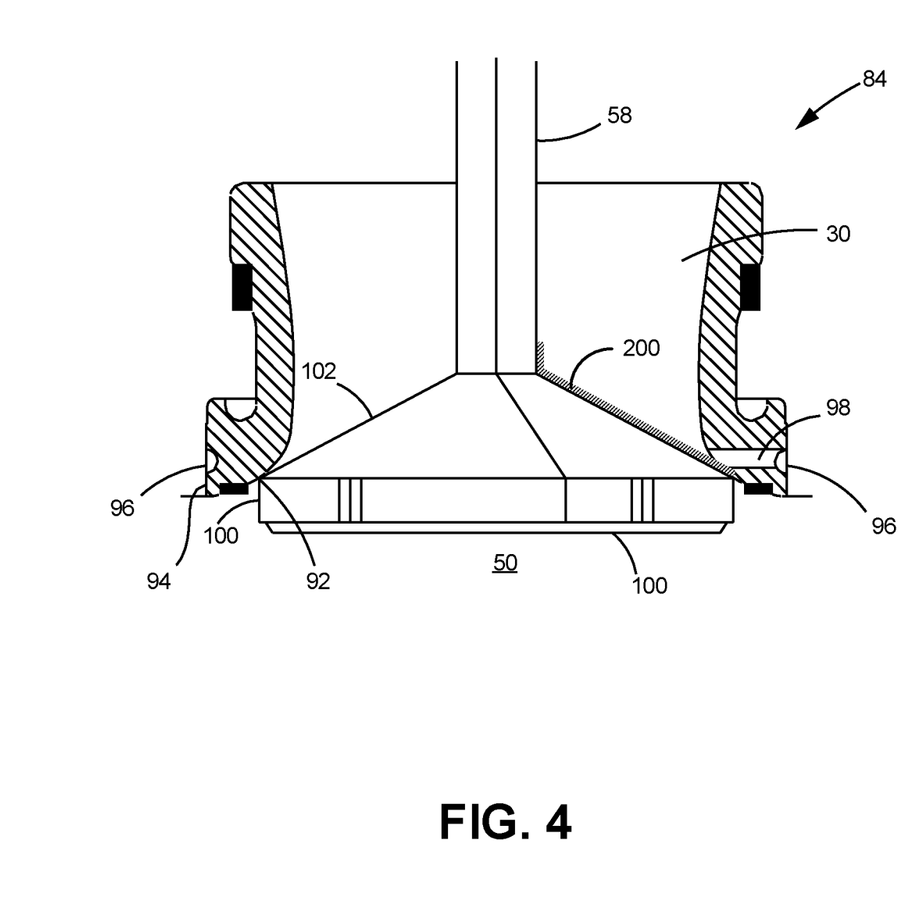
FIG. 4 is a cross-sectional view of the valve seat insert shown in FIG. 3 and an intake valve, of the internal combustion engine shown in FIG. 1, in a closed position.

FIG. 4 is a cross-sectional view of valve seat insert 84, shown in FIG. 3, and intake valve 58, of internal combustion engine 10 shown in FIG. 1, in a closed position. As shown, intake valve 58 may include an intake valve head 100 with a rear surface 102. Valve seat surface 92 may contact rear surface 102 of intake valve head 100 when intake valve 58 is in the closed position, thereby helping to maintain a pressure within combustion chamber 50 when intake valve 58 is in the closed position. When intake valve 58 is in the closed position, oil passage 98 may be prevented from communicating with combustion chamber 50.

As further shown in FIG. 4, an oleophobic coating or layer 200 may be applied to one or more portions of intake valve 58 and intake valve head 100. In some implementations, oleophobic coating 200 may be applied to one or more other portions of valve seat insert 84, as described below in connection with FIG. 5. Metal surfaces that include oleophobic coating 200 may provide a very high maximum static contact angle (e.g., greater than one-hundred degrees) for oil droplets (e.g., lube oil injected via oil passages 98) and a low minimum sliding angle (e.g., less than ten degrees) for the oil droplets. When the metal surfaces that include oleophobic coating 200 contact the lube oil, oleophobic coating 200 may prevent the lube oil from sticking and may cause the lube oil to fragment or atomize into desirable smaller droplets or beads upon contact. The smaller droplets of the lube oil may promote better mixing with an intake air charge and distribution in combustion chamber 50. In this way, oleophobic coating 200 may facilitate faster delivery of the lube oil from a point of entry to combustion chamber 50, which may enable better control of ignition timing in engine 10.

In some implementations, oleophobic coating 200 may include a material that fails to attract oil and oil-based materials; a material that includes non-polar atoms such as silicon, fluorine, chlorine, and/or the like; polytetrafluoroethylene (PTFE); tetrafluoroethylene (TFE); perfluormethyl vinyl ether (PMVE); fluorinated ethylene-propylene (FEP); cellulose acetate (CA); polymethyl methacrylate (PMMA); polypropylene (PP); polyisobutylene (PIB); polyethylene (PE); crown glass; polyvinylacetate (PCAV); polyamide (PA); polyvinylchloride (PVC); polycarbonate (PC); polystyrene (PS); polyarylate (PAR); polyethylene terephthlate (PET); and/or the like. In some implementations, oleophobic coating 200 may include a material capable of withstanding temperatures experienced in combustion chamber 50 (e.g., one-hundred degree Celsius, two-hundred degrees Celsius, three-hundred degrees Celsius, and/or the like).

In some implementations, oleophobic coating 200 may be applied as a thin coating that prevents the lube oil from sticking and causes the lube oil to atomize or disintegrate into smaller droplets upon contact. For example, oleophobic coating 200 may include a thickness measured in nanometers, micrometers, millimeters, and/or the like.

As indicated above, FIG. 4 is provided as an example. Other examples may differ from what is described in connection with FIG. 4. For example, although FIG. 4 shows oleophobic coating or layer 200 being applied to specific portions of intake valve 58 and intake valve head 100, in some implementations, oleophobic coating 200 may be applied to one or more other portions of intake valve 58 and/or intake valve head 100.

Figure 5:
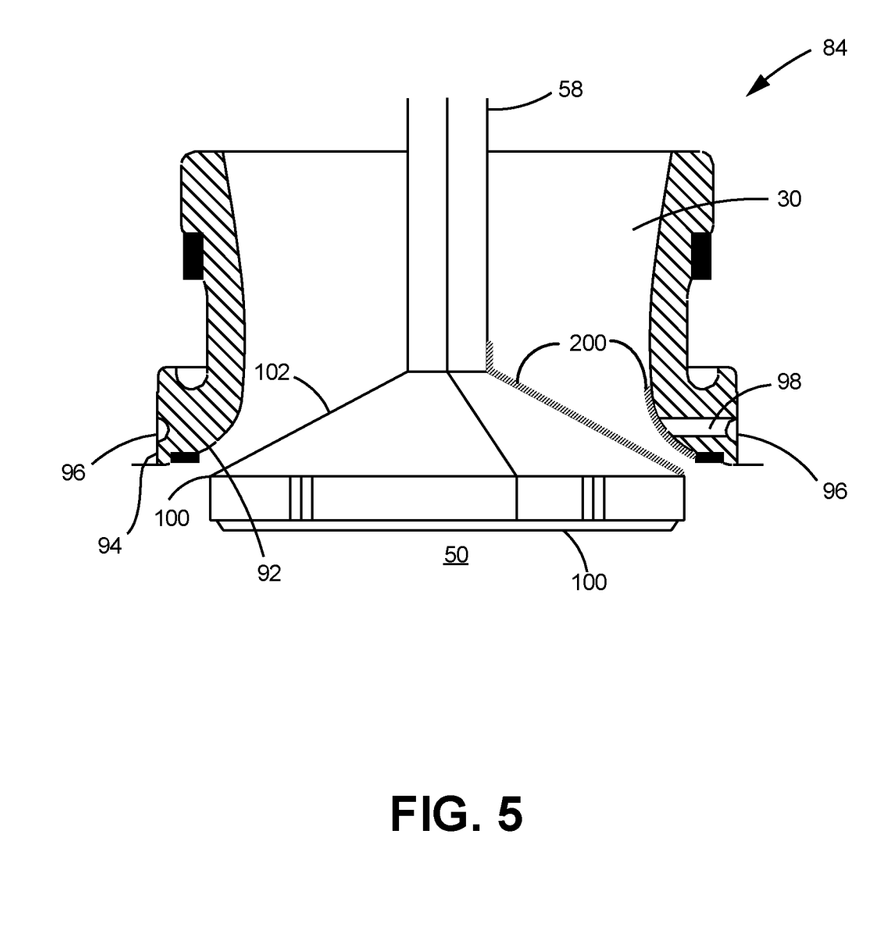
FIG. 5 is a cross-sectional view of the valve seat insert shown in FIG. 3 and the intake valve, shown in FIG. 4, in an open position.

FIG. 5 is a cross-sectional view of valve seat insert 84, shown in FIG. 3, and intake valve 58, shown in FIG. 4, in an open position. When intake valve 58 is in the open position, oil passage 98 may be in fluid communication with combustion chamber 50 and oil droplets may enter intake valve port 30, via oil passage 98, and may be provided to combustion chamber 50.

As further shown in FIG. 5, oleophobic coating 200 may be applied to one or more portions of intake valve 58 and intake valve head 100, as described above in connection with FIG. 4. Oleophobic coating 200 may also be applied to one or more portions of valve seat surface 92 adjacent to oil passage 98. Oleophobic coating 200 may include the features described above in connection with FIG. 4.

As indicated above, FIG. 5 is provided as an example. Other examples may differ from what is described in connection with FIG. 5. For example, although FIG. 5 shows oleophobic coating or layer 200 being applied to specific portions of intake valve 58, intake valve head 100, and valve seat surface 92, in some implementations, oleophobic coating 200 may be applied to one or more other portions of intake valve 58, intake valve head 100, and/or valve seat surface 92.

Figure 6A:
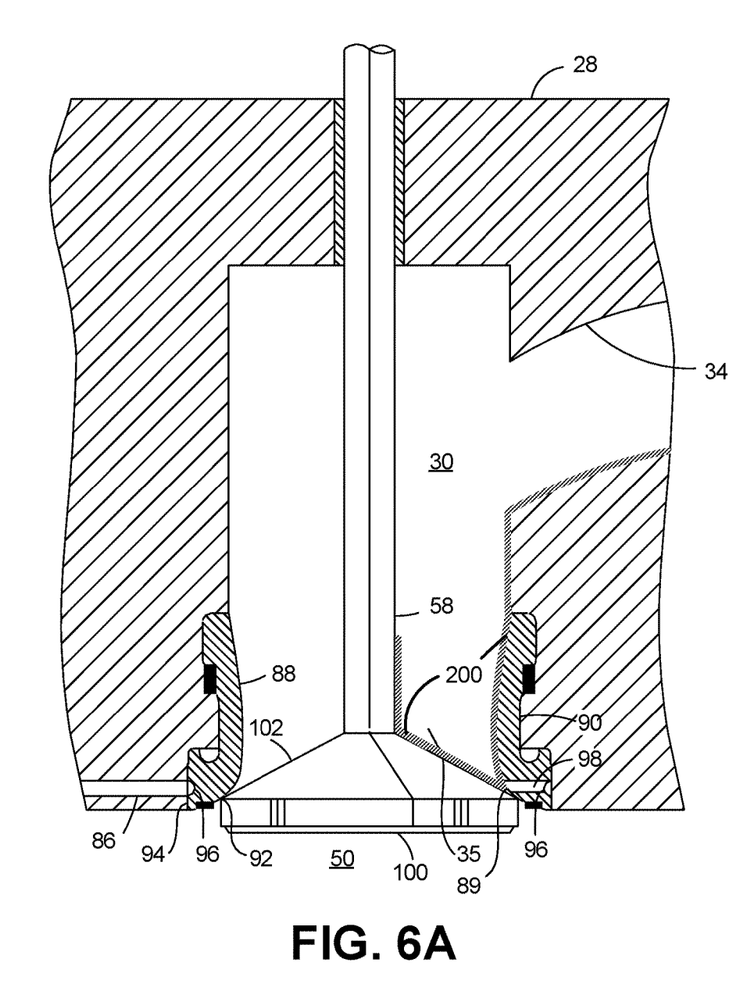
FIGS. 6A and 6B are enlarged cross-sectional views of portions of the internal combustion engine shown in FIG. 1.

FIG. 6A is an enlarged cross-sectional view of a portion of internal combustion engine 10 shown in FIG. 1. As shown, intake valve 58 may be in the closed position, with rear surface 102 of intake valve head 100 contacting valve seat surface 92 of valve seat insert 84. Oil or other combustible fluid may flow through oil channel 86 and may enter groove 96. The oil may first fill up in groove 96 and then may flow through one or more oil passages 98 and into intake valve port 30. Each oil passage 98 may include an outlet 89 located on an inner wall 88 above valve seat surface 92 so that each oil passage 98 may communicate with intake valve port 30 even when intake valve 58 is in the closed position.

Groove 96 may be configured to avoid any alignment issues between oil channel 86 in cylinder head 28 and oil passage 98 in valve seat insert 84. That is, since groove 96 extends around an exterior periphery of valve seat insert 84 and since oil channel 86 in cylinder head 28 feeds oil into groove 96, oil channel 86 may or may not be linearly aligned with any of one or more oil passages 98 in valve seat insert 84. For example, as shown in FIG. 6A, oil channel 86 and oil passage 98 may be spaced one-hundred and eighty degrees apart. Oil from oil channel 86 may enter groove 96 on one side of valve seat insert 84 (e.g., a left side shown in FIG. 6A) and may fill up groove 96 before exiting groove 96 through oil passage 98 on a diametrically opposite side of valve seat insert 84 (e.g., a right side shown in FIG. 6A). Groove 96 may also allow oil channel 86 in cylinder head 28 to feed multiple oil passages 98 in valve seat insert 84. For example, a single oil channel 86 may be associated with more than one oil passage 98.

If valve seat insert 84 defines multiple oil passages 98, arrangements of oil passages 98, with respect to each other, may vary. Oil passages 98 may or may not be spaced equally apart around valve seat insert 84. For example, valve seat insert 84 may define eight oil passages 98 spaced equally apart every forty-five degrees, four oil passages 98 spaced equally apart every ninety degrees, two oil passages 98 spaced one-hundred and eighty degrees apart, and/or the like. In another example, two oil passages 98 may be drilled on a same general side of valve seat insert 84, but may be provided in a configuration that causes the oil from each oil passage 98 to impinge on the oil from another oil passage 98. The orientation and location of oil passages 98 on valve seat insert 84 may also be coordinated appropriately depending upon an amount of swirl used on the intake.

In operation, oil droplets may be introduced into combustion chamber 50 by injecting a very small quantity of oil, timed with the opening of intake valve 58, through each oil passage 98 defined by cylinder head 28 and valve seat insert 84. Alternatively, or in addition to intermittent flow, a small quantity of oil or other combustible fluid may be continuously supplied via each oil passage 98. In such a case, some oil may accumulate on rear surface 102 of intake valve head 100 and may shear off in the form of smaller oil droplets. The smaller oil droplets may be provided into combustion chamber 50 by incoming high velocity air-fuel mixture in intake valve port 30.

Oil passages 98 may extend substantially radially through the valve seat insert 84. For example, oil passages 98 may extend in a line that is normal (e.g., perpendicular) to a cylindrical portion of outer wall 90 of valve seat insert 84 so that oil droplets may enter intake valve port 30 in a radial direction. In another example, oil passages 98 may extend at an oblique angle with respect to outer wall 90 of valve seat insert 84 so that oil droplets may enter intake valve port 30 at an angle to the radial direction.

In some implementations, when engine 10 is a gasoline internal combustion engine (e.g., a higher-power density gasoline direct-inject engine), engine 10 may encounter a pre-ignition issue predominantly resulting from stray engine lube oil droplets that make their way into the combustion chamber (e.g., which randomly occurs in a few engine cycles out of a one or two thousand engine cycles). The pre-ignition issue occurs specifically at lower speed and high load operating conditions.

The pre-ignition issue in a gasoline engines is somewhat different from natural gas engines where there is no clear cut pre-ignition issue from lube oil droplets. However, by properly designing the lube oil and controlling characteristics of the lube oil, for gasoline engines, some additional ignition delays may be introduced via the oil droplets so that droplet ignition occurs later in a compression cycle. This, in addition to carefully controlling the gasoline injection timing, may result in a scenario where oil droplet induced ignition becomes a sole source of ignition of an injected gasoline and air fuel mixture, which avoids use of spark-plug ignition. Under these conditions, the oil droplets may be injected in every cycle of the engine (e.g., just like in natural gas engines) and may be prevented from sticking to metal surfaces via oleophobic coating 200.

As further shown in FIG. 6A, oleophobic coating 200 may be applied to one or more portions of intake valve 58 and intake valve head 100, as described above in connection with FIG. 4. Oleophobic coating 200 may also be applied to one or more portions of valve seat surface 92 adjacent to oil passage 98, as described above in connection with FIG. 5. In some implementations, and as shown in FIG. 6A, oleophobic coating 200 may be applied to one or more portions of intake conduit 34 of cylinder head 28 and/or one or more portions of intake valve port 30. Oleophobic coating 200 may include the features described above in connection with FIG. 4.

Figure 6B:
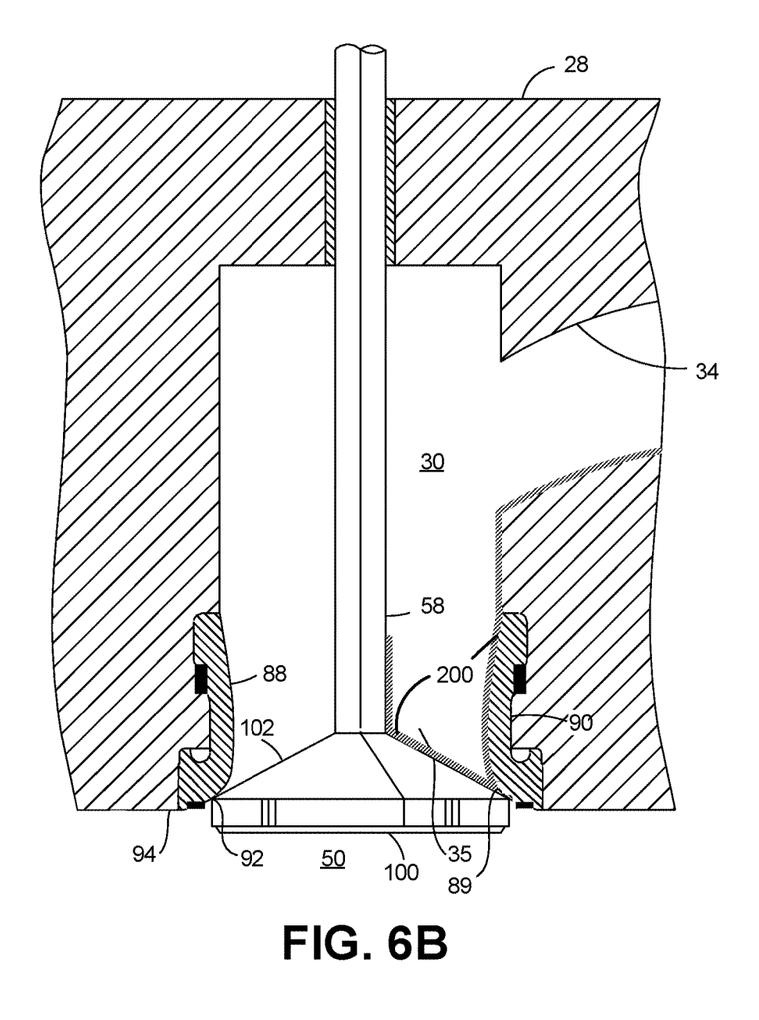

FIG. 6B is an enlarged cross-sectional view of a portion of internal combustion engine 10, shown in FIG. 1, and according to some implementations. As shown, engine 10 may include the components shown in FIG. 6A, except that oil channel 86, groove 96, and oil passage 98 may be omitted. In such implementations, oil droplets may be introduced into intake valve port 30 and combustion chamber 50 via intake conduit 34. Thus, oleophobic coating 200 may be applied to one or more portions of intake conduit 34 of cylinder head 28 and/or one or more portions of intake valve port 30.

As indicated above, FIGS. 6A and 6B are provided as examples. Other examples may differ from what was described in connection with FIGS. 6A and 6B. For example, although FIGS. 6A and 6B shows oleophobic coating or layer 200 being applied to specific portions of intake valve 58, intake valve head 100, valve seat surface 92, intake conduit 34, and intake valve port 30, in some implementations, oleophobic coating 200 may be applied to one or more other portions of intake valve 58, intake valve head 100, valve seat surface 92, intake conduit 34, and/or intake valve port 30.

INDUSTRIAL APPLICABILITY

In addition to the normal lubrication oil use, lube oil may be introduced in very small quantities into combustion chamber 50 of an internal combustion engine (e.g., engine 10). Fragmented lube oil droplets distributed inside combustion chamber 50 may ignite to act as sources of ignition for an air/fuel mixture in combustion chamber 50. The lube oil may be introduced into intake valve port 30 or through fine interconnected oil passages 98 made in cylinder head 28 and valve seat inserts 84 of intake valves 58. In both cases, the lube oil fragments may be carried into combustion chamber 50 by an intake charge. The lube oil comes into contact with metal surfaces (e.g., inner walls of intake valve ports 30, a backside of a valve face, valve seat insert 84, and/or the like) and may leave a varnish type deposit with time due to oil oxidation. This may change flow characteristics of freshly introduced lube oil. The lube oil may take longer to reach combustion chamber 50 from a point of entry, and may continue to enter into combustion chamber 50 long after injection has ceased. This may make the control of starting and/or stopping of ignition timing difficult in engine 10.

Oleophobic coatings 200 applied to various metal surfaces, of engine 10, that come into contact with the lube oil, may prevent the lube oil from sticking. Oleophobic coatings 200 may also ensure that the lube oil fragments into smaller droplets upon contact, which may promote better mixing with an intake air charge and distribution in combustion chamber 50. Thus, oleophobic coatings 200 facilitate faster delivery of the lube oil from a point of entry to combustion chamber 50 and enable better control of ignition timing in engine 10.

By enabling better control of the ignition timing, oleophobic coatings 200 may prevent engine 10 from becoming inoperable due to an ignition timing issue, requiring maintenance and/or replacement of components, and/or the like. An inoperable engine 10 and/or performing maintenance on engine 10 may cause lost time associated with use of a machine employing engine 10. Such issues may cause resources (e.g., human resources, machine resources, maintenance resources, and/or the like) to be wasted in repairing and/or maintaining an inoperable engine 10. Thus, oleophobic coatings 200 prevent such resources from being wasted.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. An internal combustion engine assembly comprising:
   an engine block comprising a piston cylinder;
   a piston moveable in reciprocal motion within the piston cylinder;
   a cylinder head mounted on the engine block,
      wherein the engine block, the cylinder head, and the piston define a combustion chamber;
   an intake conduit mounted to the cylinder head;
   an intake valve port defined by the cylinder head,
      wherein the intake valve port is in fluid communication with the intake conduit and with the combustion chamber;
   an intake valve mounted in reciprocally movable fashion to the cylinder head for selectively placing the intake valve port in fluid communication with the combustion chamber;
   a first oleophobic coating provided on one or more portions of the intake valve,
      wherein the one or more portions of the intake valve include one or more surfaces that provide, with the first oleophobic coating, a maximum static contact angle that is greater than one-hundred degrees for oil and a minimum sliding angle that is less than ten degrees for the oil, and
      wherein the first oleophobic coating provided on the one or more portions of the intake valve causes the oil on the one or more portions of the intake valve to atomize into smaller droplets or beads upon contact with the one or more portions of the intake valve; and
   a valve seat insert secured to the cylinder head near an outlet end of the intake valve port,
      wherein the valve seat insert includes a valve seat surface for contacting the intake valve when the intake valve is in a closed position,
      wherein the valve seat insert defines an oil passage in fluid communication with an oil supply conduit and the intake valve port, and
      wherein the oil is to be introduced into the combustion chamber by pumping the oil through the oil passage.

2. The internal combustion engine assembly of claim 1, further comprising:
   a second oleophobic coating provided on one or more portions of the valve seat insert adjacent to the oil passage.

3. The internal combustion engine assembly of claim 1, further comprising:
   a second oleophobic coating provided on one or more portions of the intake conduit; and
   a third oleophobic coating provided on one or more portions of the intake valve port.

4. The internal combustion engine assembly of claim 1, wherein the first oleophobic coating comprises one or more of:
   a material that fails to attract oil and oil-based materials, or
   a material that includes non-polar atoms.

5. The internal combustion engine assembly of claim 1, wherein the first oleophobic coating comprises one or more of:
   polytetrafluoroethylene,
   tetrafluoroethylene,
   perfluormethyl vinyl ether,
   fluorinated ethylene-propylene,
   cellulose acetate,
   polymethyl methacrylate,
   polypropylene,
   polyisobutylene,
   polyethylene,
   crown glass,
   polyvinyl acetate,
   polyamide;
   polyvinylchloride,
   polycarbonate,
   polystyrene,
   polyacrylate, or
   polyethylene terephthalate.

6. The internal combustion engine assembly of claim 1, wherein the first oleophobic coating comprises a material capable of withstanding temperatures experienced in the combustion chamber.

7. The internal combustion engine assembly of claim 1, wherein the first oleophobic coating prevents the oil from sticking.

8. An intake valve assembly provided in an internal combustion engine that includes an engine block with a piston cylinder, a piston moveable in reciprocal motion within the piston cylinder, a cylinder head mounted on the engine block, and an intake conduit mounted to the cylinder head, wherein the engine block, the cylinder head, and the piston define a combustion chamber, the intake valve assembly comprising:
 an intake valve port defined by the cylinder head,
  wherein the intake valve port is in fluid communication with the intake conduit and with the combustion chamber;
 an intake valve mounted in reciprocally movable fashion to the cylinder head for selectively placing the intake valve port in fluid communication with the combustion chamber;
 a first oleophobic coating provided on one or more portions of the intake valve port,
  wherein the one or more portions of the intake valve port include one or more surfaces that provide, with the first oleophobic coating, a maximum static contact angle that is greater than one-hundred degrees for oil and a minimum sliding angle that is less than ten degrees for the oil, and
  wherein the first oleophobic coating provided on the one or more portions of the intake valve port causes the oil on the one or more portions of the intake valve port to atomize into smaller droplets or beads upon contact with the one or more portions of the intake valve port; and
 a valve seat insert secured to the cylinder head near an outlet end of the intake valve port,
  wherein the valve seat insert includes a valve seat surface for contacting the intake valve when the intake valve is in a closed position,
  wherein the valve seat insert defines an oil passage in fluid communication with an oil supply conduit and the intake valve port, and
  wherein the oil is to be introduced into the combustion chamber by pumping the oil through the oil passage.

9. The intake valve assembly of claim 8, further comprising:
 a second oleophobic coating provided on one or more portions of the valve seat insert adjacent to the oil passage.

10. The intake valve assembly of claim 8, further comprising:
 a second oleophobic coating provided on one or more portions of the intake conduit; and
 a third oleophobic coating provided on one or more portions of the intake valve.

11. The intake valve assembly of claim 8, wherein the first oleophobic coating comprises one or more of:
 a material that fails to attract oil and oil-based materials, or
 a material that includes non-polar atoms.

12. The intake valve assembly of claim 8, wherein the first oleophobic coating comprises a material capable of withstanding temperatures experienced in the combustion chamber.

13. The intake valve assembly of claim 8, wherein the first oleophobic coating prevents the oil from sticking and causes the oil to atomize into smaller droplets upon contact.

14. A machine, comprising:
 an engine block for an internal combustion engine,
  wherein the engine block includes a piston cylinder;
 a piston moveable in reciprocal motion within the piston cylinder;
 a cylinder head mounted on the engine block,
  wherein the engine block, the cylinder head, and the piston define a combustion chamber;
 an intake conduit mounted to the cylinder head;
 an intake valve port defined by the cylinder head,
  wherein the intake valve port is in fluid communication with the intake conduit and with the combustion chamber;
 a first oleophobic coating provided on one or more portions of the intake valve port;
 an intake valve mounted in reciprocally movable fashion to the cylinder head for selectively placing the intake valve port in fluid communication with the combustion chamber;
 a second oleophobic coating provided on one or more portions of the intake valve,
  wherein the one or more portions of the intake valve include one or more surfaces that provide, with the second oleophobic coating, a maximum static contact angle that is greater than one-hundred degrees for oil and a minimum sliding angle that is less than ten degrees for the oil, and
  wherein the second oleophobic coating provided on the one or more portions of the intake valve causes the oil on the one or more portions of the intake valve to atomize into smaller droplets or beads upon contact with the one or more portions of the intake valve; and
 a valve seat insert secured to the cylinder head near an outlet end of the intake valve port,
  wherein the valve seat insert includes a valve seat surface for contacting the intake valve when the intake valve is in a closed position,
  wherein the valve seat insert defines an oil passage in fluid communication with an oil supply conduit and the intake valve port, and
  wherein the oil is to be introduced into the combustion chamber by pumping the oil through the oil passage.

15. The machine of claim 14, further comprising:
 a third oleophobic coating provided on one or more portions of the valve seat insert adjacent to the oil passage; and
 a fourth oleophobic coating provided on one or more portions of the intake conduit.

16. The machine of claim 14, wherein each of the first oleophobic coating and the second oleophobic coating comprises one or more of:
 a material that fails to attract oil and oil-based materials, or
 a material that includes non-polar atoms.

17. The machine of claim 14, wherein each of the first oleophobic coating and the second oleophobic coating comprises:
 a material capable of withstanding temperatures experienced in the combustion chamber, and
 a thickness measured in one of nanometers, micrometers, or millimeters.

18. The internal combustion engine assembly of claim 1, wherein the oil fills up a groove before flowing through the oil passage.

19. The internal combustion engine assembly of claim 18, wherein the groove extends around an exterior periphery of the valve seat insert.

20. The internal combustion engine assembly of claim 1, wherein the first oleophobic coating comprises a material that includes non-polar atoms.

\* \* \* \* \*